US010763755B2

(12) United States Patent
Ishigaki

(10) Patent No.: US 10,763,755 B2
(45) Date of Patent: Sep. 1, 2020

(54) SYMMETRICAL ISOLATED DC-DC POWER CONVERSION CIRCUIT

(71) Applicant: TOYOTA MOTOR ENGINEERING & MANUFACTURING NORTH AMERICA, INC., Erlanger, KY (US)

(72) Inventor: Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/423,250

(22) Filed: Feb. 2, 2017

(65) Prior Publication Data

US 2018/0175736 A1 Jun. 21, 2018

Related U.S. Application Data

(60) Provisional application No. 62/435,117, filed on Dec. 16, 2016.

(51) Int. Cl.
*H02M 3/335* (2006.01)
*H02M 3/00* (2006.01)
*H02M 1/00* (2006.01)

(52) U.S. Cl.
CPC ....... *H02M 3/33584* (2013.01); *H02M 3/005* (2013.01); *H02M 3/33546* (2013.01); *H02M 2001/0058* (2013.01)

(58) Field of Classification Search
CPC ......... H02M 3/33546; H02M 3/33584; H02M 3/005; H02M 2001/0058
See application file for complete search history.

(56) References Cited

U.S. PATENT DOCUMENTS

| 6,574,125 | B2 * | 6/2003 | Matsukawa ....... H02M 3/33569 363/132 |
| 7,450,402 | B2 | 11/2008 | Jitaru |
| 7,570,497 | B2 | 8/2009 | Jacques et al. |
| 8,724,348 | B2 | 5/2014 | Sase et al. |
| 9,106,141 | B2 | 8/2015 | Hosotani |
| 9,379,628 | B2 | 6/2016 | Zambetti et al. |
| 2008/0304292 | A1 * | 12/2008 | Zeng ..................... H02M 3/285 363/21.12 |

(Continued)

*Primary Examiner* — Fred E Finch, III
*Assistant Examiner* — Rafael O. De León Domenech
(74) *Attorney, Agent, or Firm* — Oblon, McClelland, Maier & Neustadt, L.L.P.

(57) ABSTRACT

A power transfer system includes power conversion circuitry that has first circuitry and second circuitry on either side of a transformer that include a transformer having a power supply, a switch, a capacitor connected in parallel with a winding of the transformer, and an inductor connected between the power supply and the capacitor. The inductor provides an additional resonance current path through the power conversion circuitry that is configured to reduce a peak voltage at the switch. A direction of power transfer through the power conversion circuit is determined, and the first circuitry and the second circuitry are configured based on the determined direction of power transfer. The switches of the first circuitry and second circuitry are controlled using switching based on the determined direction of power transfer and a quantity of power transfer.

19 Claims, 16 Drawing Sheets

(56) References Cited

U.S. PATENT DOCUMENTS

| | | | |
|---|---|---|---|
| 2013/0300210 A1* | 11/2013 | Hosotani | H02J 5/005 307/104 |
| 2014/0054971 A1 | 2/2014 | Kissin et al. | |
| 2014/0225439 A1 | 8/2014 | Mao | |
| 2016/0352231 A1* | 12/2016 | Quigley | H02M 3/33507 |

* cited by examiner

SYMMETRICAL ISOLATED DC-DC POWER CONVERSION CIRCUIT

CROSS-REFERENCE TO RELATED APPLICATIONS

This application is based on, and claims the benefit of priority to, provisional application No. 62/435,117, filed Dec. 16, 2016, the entire contents of which are incorporated herein by reference.

BACKGROUND

A DC-DC power conversion circuit can employ magnetic isolation to conduct bi-directional power transfer. U.S. Pat. No. 9,106,141 entitled "Switching Power Supply Device" to Hosotani describes a switching power supply device with a multi-resonant circuit that is controlled with a switching frequency that is greater than a resonant frequency in order to implement zero voltage switching (ZVS).

SUMMARY

In an exemplary implementation, a system can include: power conversion circuitry including first circuitry on a first side of a transformer having a first power supply, a first switch, a first capacitor connected in parallel with a first winding of the transformer, and a first inductor connected between the first power supply and the first capacitor, and second circuitry on a second side of the transformer having a second power supply, a second switch, a second capacitor connected in parallel with a second winding of the transformer, and a second inductor connected between the second power supply and the second capacitor, where the first inductor or the second inductor provides an additional resonance current path through the power conversion circuitry that is configured to reduce a peak voltage at the first switch or the second switch; and control circuitry configured to determine a direction of power transfer through the power conversion circuitry, configure the first circuitry and the second circuitry based on the determined direction of power transfer, and control switching of the first switch and the second switch based on the determined direction of power transfer and a quantity of power transfer.

The first circuitry and the second circuitry can be symmetric on either side of the transformer, and the power conversion circuitry can be configured to perform bi-directional power transfer.

The system can control the switching of the first switch and the second switch by implementing soft switching.

The power conversion circuitry, in response to the control circuitry turning on the first switch, can generate at least one first resonance current through a first leakage inductor of the first circuitry and a second leakage inductor of the second circuitry for a first period of time in which the second capacitor is charged by the at least one first resonance current. The first period of time that the at least one first resonance current flows through the first leakage inductor and the second leakage inductor remains constant independent of an on-time of the first switch. The power conversion circuitry, in response to the second voltage of the second switch reaching zero due to the at least one first resonance current, can generate at least one second resonance current through the first leakage inductor, the second leakage inductor, and a body diode of the second switch for a second period of time during which energy is transferred from the first power supply to the second power supply through the at least one second resonance current path. An increase in an on-time of the first switch can correspond to an increase in the second period of time associated with the at least one second resonance current.

The power conversion circuitry, in response to the control circuitry turning off the first switch, can generate at least one third resonance current through a first leakage inductor of the first circuitry and a second leakage inductor of the second circuitry for a third period of time during which energy is discharged from the first capacitor through the first leakage inductor and the second leakage inductor, and the second power supply charges an output capacitance of the first switch via the at least one third resonance current. A first voltage at the first switch can increase sinusoidally to a first peak voltage during the third period of time based on the at least one third resonance current. The power conversion circuitry, in response to a transformer current becoming negative, can generate at least one fourth resonance current through the first leakage inductor of the first circuitry and the second leakage inductor of the second circuitry for a fourth period of time during which the energy is discharged from the second capacitor through the first leakage inductor and the second leakage inductor. The first voltage at the first switch can decrease sinusoidally to zero and a second voltage at the second switch increases to a second peak voltage during the fourth period of time.

The first inductor can provide the additional resonance current path through the first inductor, the first capacitor, and the first switch. The power conversion circuitry can be configured to generate an additional resonance current through the additional resonance current path during the third period of time and the fourth period of time when the first switch is turned off. A frequency of the additional resonance current can be based on a capacitance of the first capacitor, an output capacitance of the first switch, and an inductance of the first inductor.

The system can further include a plurality of the power conversion circuitry connected in parallel. The system can control the switching of the first switch or the second switch of the plurality of the power conversion circuitry using phase shift control of the first switch or the second switch. The system can determine an amount of phase shift between a plurality of switches associated with the plurality of the power conversion circuitry based on a number of the power conversion circuitry connected in parallel.

A process includes determining a direction of power transfer through power conversion circuitry including first circuitry on a first side of a transformer having a first power supply, a first switch, a first capacitor connected in parallel with a first winding of the transformer, and a first inductor connected between the first power supply and the first inductor, and second circuitry on a second side of the transformer having a second power supply, a second switch, a second capacitor connected in parallel with a second winding of the transformer, and a second inductor connected between the second power supply and the second inductor; configuring the first circuitry and the second circuitry based on the determined direction of power transfer; and controlling switching of the first switch and the second switch based on the determined direction of power transfer and a quantity of power transfer.

A system includes: control circuitry configured to determine a direction of power transfer through power conversion circuitry including first circuitry on a first side of a transformer having a first power supply, a first switch, a first capacitor connected in parallel with a first winding of the transformer, and a first inductor connected between the first power supply and the first inductor, and second circuitry on a second side of the transformer having a second power supply, a second switch, a second capacitor connected in parallel with a second winding of the transformer, and a second inductor connected between the second power supply and the second inductor, configure the first circuitry and the second circuitry based on the determined direction of power transfer, and control switching of the first switch and the second switch based on the determined direction of power transfer and a quantity of power transfer.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
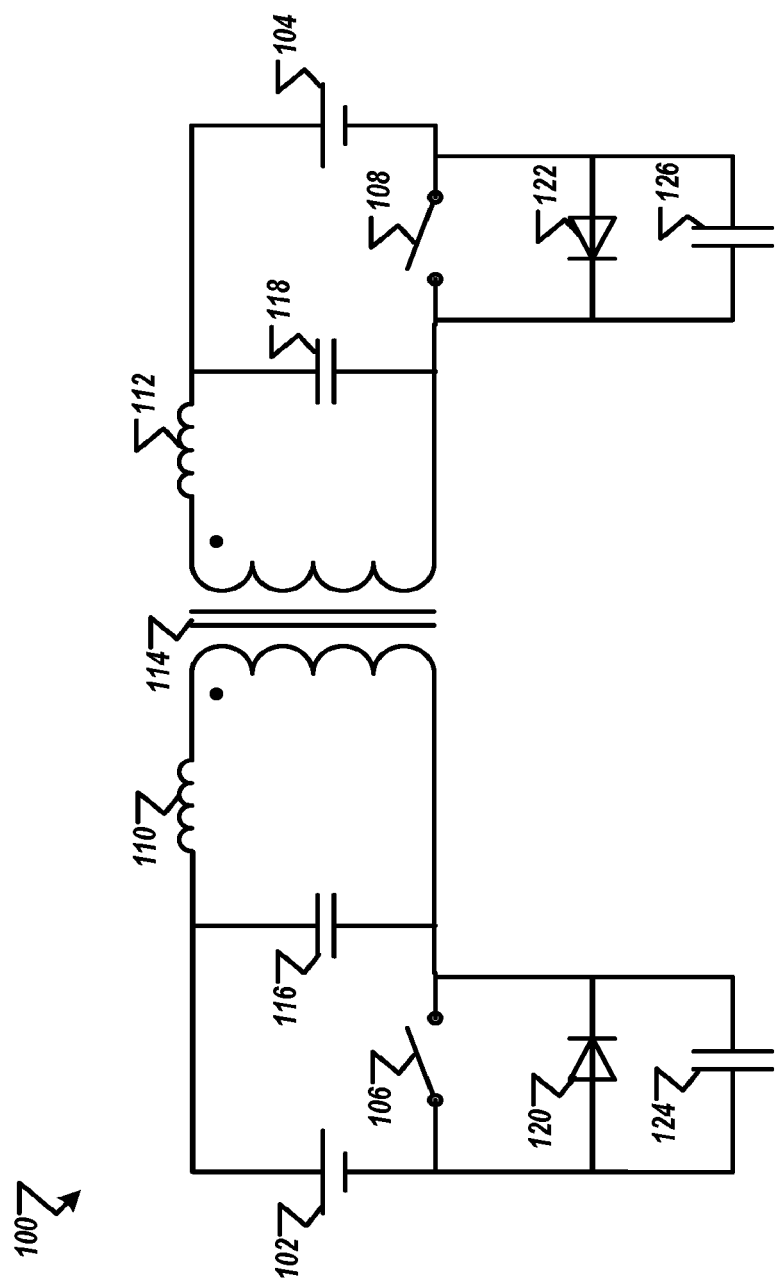
FIG. 1 is an exemplary schematic diagram of an isolated DC-DC power conversion circuit.

FIG. 1 is an exemplary illustration of an isolated DC-DC power conversion circuit 100. The isolated DC-DC power conversion circuit 100 can include a primary side and a secondary side that are symmetrical on either side of a magnetic core transformer 114. The primary side can include a primary switch 106 and a primary DC power supply 102, and the secondary side can include a secondary switch 108 and a secondary DC power supply 104. The primary switch 106 can be a MOSFET with a body diode 120 and output capacitance 124, and the secondary switch 108 can be a MOSFET with a body diode 122 and output capacitance 126. In some implementations, the diodes 120 and 124 and capacitors 124 and 126 can also be external components connected in parallel with the switches 106 and 108. The isolated DC-DC power conversion circuit 100 also includes capacitors 116 and 118 on the primary and secondary sides, respectively. The capacitor 116 is connected in parallel with a primary winding of the magnetic core transformer 114, and the capacitor 118 is connected in parallel with a secondary winding of the magnetic core transformer 114. In some aspects, a turn ratio N of the magnetic core transformer 114 is determined based on the ratio of the voltage of the primary DC power supply 110 to the voltage of the secondary DC power supply 112. The isolated DC-DC power conversion circuit 100 also includes leakage inductors 110 and 112 that represented leakage of the magnetic core transformer 114 on the primary and secondary sides. As will be discussed in detail further herein, the leakage inductors 110 and 112 provide a resonance current path together with one or more of the capacitors 116, 118, 124, and 126 as power is transferred between the primary and secondary sides of the isolated DC-DC power conversion circuit 100.

In certain implementations, the isolated DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during battery cell balancing.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In some implementations, the primary switch 106 and secondary switch 108 are controlled by gate drivers that are integrated into the primary switch 106 and the secondary switch 108.

In addition, the switch 106 or 108 on the side of the isolated DC-DC power conversion circuit 100 that is receiving energy from the opposite side can be operated as a synchronous rectifier to reduce losses through the isolated DC-DC power conversion circuit. For example, when power is transferred from the primary side to the secondary side of the isolated DC-DC power conversion circuit 100 by cycling the primary switch 106 on and off, the secondary switch 108 can be closed during the off-time of the primary switch 106 so that current flows through the secondary switch 108 rather than the diode 122, which improves circuit efficiency.

Figure 2:
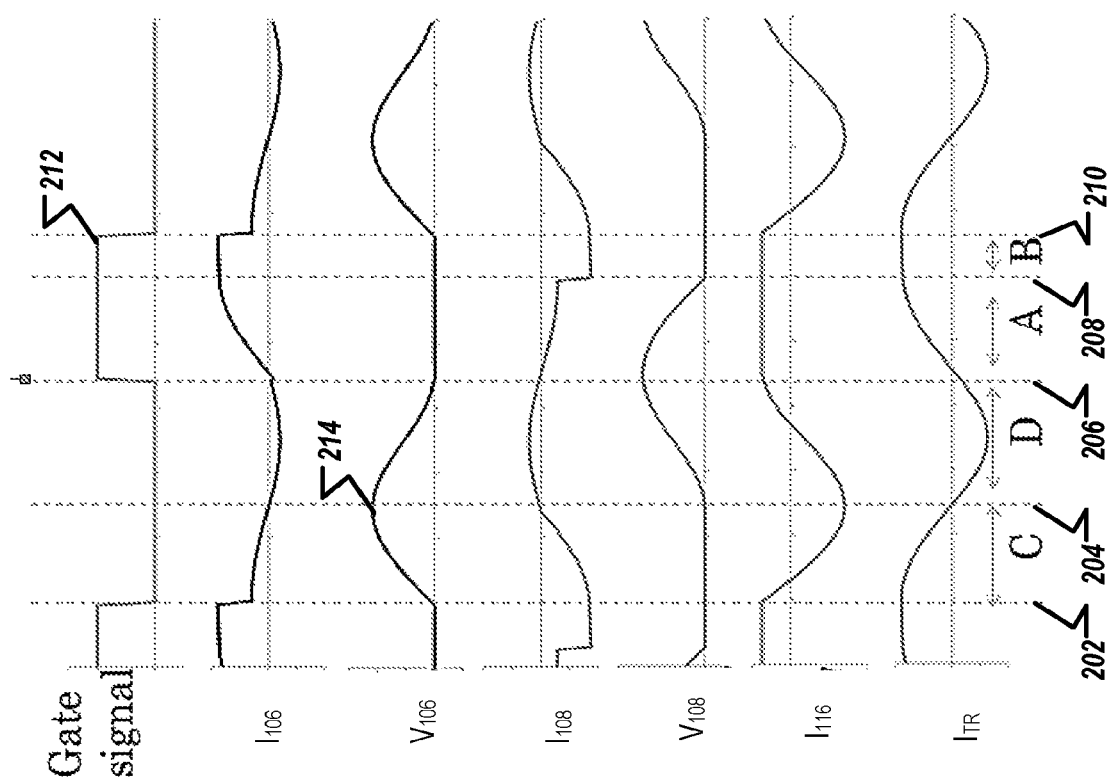
FIG. 2 is an exemplary illustration of current and voltage waveforms of an isolated DC-DC power conversion circuit.

FIG. 2 is an exemplary illustration of current and voltage waveforms for an isolated DC-DC power conversion circuit 100 with respect to time for a duty cycle of the primary switch 106. For example, waveform 212 illustrates a duty cycle for the primary switch 106 that can be turned on at time 206 and subsequently turned off at time 210, according to some implementations. The waveforms shown in FIG. 2 include primary switch current $I_{106}$, primary switch voltage $V_{106}$, secondary switch current $I_{108}$, secondary switch voltage $V_{ios}$, primary capacitor current $I_{116}$, and transformer current $I_{TR}$. In some implementations, the transformer current $I_{TR}$ represents an amount of power transferred between the primary and secondary sides of the DC-DC power conversion circuit 100. In addition, the waveforms are divided into four time periods (A, B, C, and D) that are divided by times 202, 204, 206, 208, and 210. The amount of power transferred from the primary side to the secondary side of the isolated DC-DC power conversion circuit 100 can be modified by increasing or decreasing an on-time of the primary switch 106. For example, to increase the amount of power transferred from the primary side to the secondary side of the isolated DC-DC power conversion circuit 100, the on-time of the primary switch 106 is increased. Likewise, to decrease the amount of power transferred from the primary side to the secondary side of the isolated DC-DC power conversion circuit 100, the on-time of the primary switch 106 is decreased. In addition, off-time of the primary switch 106 and secondary switch 108 can be kept constant in order to maintain soft-switching, particularly zero voltage switch (ZVS), which reduces circuit losses and improves efficiency.

In some implementations, bi-directional power transfer can be performed by transferring power from the secondary side to the primary side of the isolated DC-DC power conversion circuit 120 by cycling the secondary switch 108 on and off. The description of the transfer of power from the secondary side to the primary side of the isolated DC-DC power conversion circuit 120 can also be applied to bi-directional power transfer in a straightforward way to one of ordinary skill in the art.

The duty cycle, switching frequency, and direction of power transfer within the isolated DC-DC power conversion circuit 100 can be controlled by one or more electronic control units (ECUs) or similar circuitry. For example, sensors can be installed within battery cells of an electric vehicle (EV) that can sense battery state of charge (SOC), voltage, and the like. In an implementation, the ECUs can process sensor data, display battery SOC information to a user, and send control signals to actuators that align the isolated DC-DC power conversion circuit 100. The ECUs can control the direction of power transfer as well as the quantity of power transferred by the isolated DC-DC power conversion circuit 100 by controlling the duty cycles and switching frequencies of the primary switch 106 and the secondary switch 108. The ECUs can also align the isolated DC-DC power conversion circuit 100 to perform functions determined by input from a user.

Figure 3A:
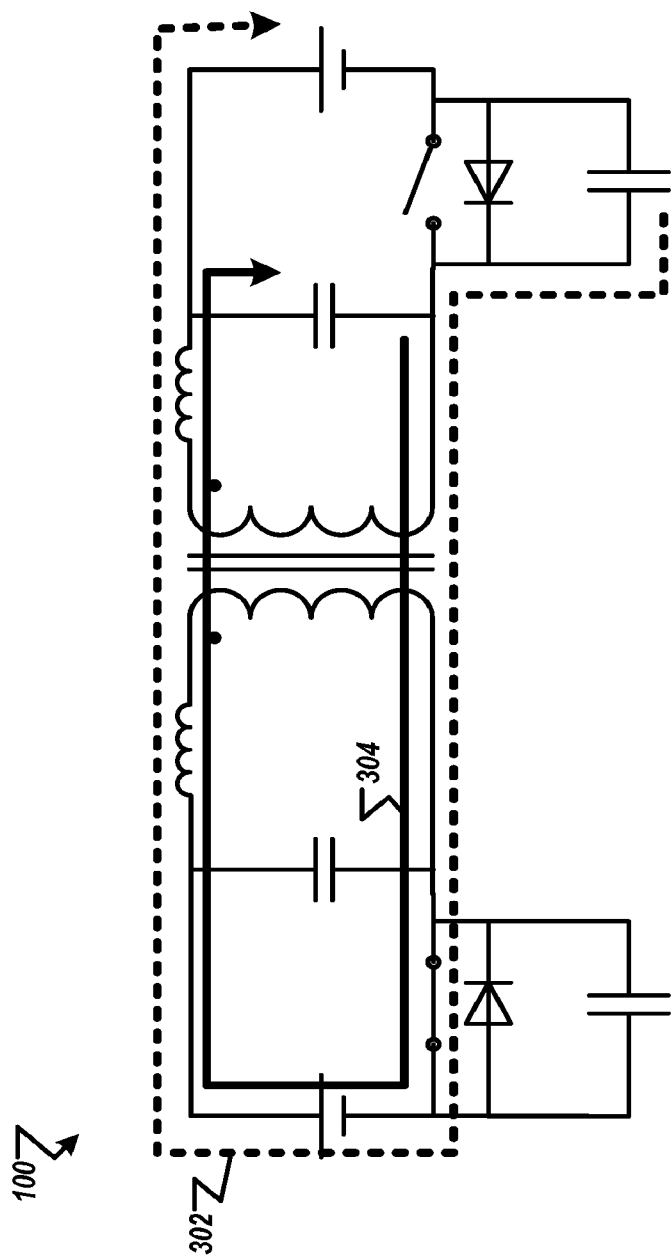
FIGS. 3A-3D illustrate exemplary current flow paths through an isolated DC-DC power conversion circuit.

FIGS. 3A-3D illustrate exemplary current flow paths through the isolated DC-DC power conversion circuit 100 that correspond to time periods A-E shown in FIG. 2. Reference numerals for the components of the isolated DC-DC power conversion circuit 100 are not shown in FIGS. 3A-3D for clarity of the figures but can be assumed to correspond to the reference numerals shown in FIG. 1. FIG. 3A illustrates current flow paths in isolated DC-DC power conversion circuit 100 between times 206 and 208 (time period A). At time 206, the primary switch 106 can be turned on by control circuitry of the ECU. In some aspects, the primary switch 106 is turned on when the voltage at the primary switch $V_{106}$ is zero in order to implement ZVS. The primary switch voltage $V_{106}$ remains at zero between times 206 and 208. In response to the primary switch 106 being turned on, resonance currents 302 and 304 flow through leakage inductors 110 and 112. For example, current 304 corresponds to the primary switch current $U_{106}$ shown in FIG. 2, which increases sinusoidally between times 206 and 208, as does a transformer current $I_{TR}$. The current 304 has LC resonance based on the leakage inductors 110 and 112 and the capacitor 118 and charges the capacitor 118 until a voltage at the capacitor 118 reaches a voltage of the secondary power supply 104. The current 302 discharges energy from the output capacitance 126 of the secondary switch 108 and has LC resonance based on the leakage inductors 110 and 112 and the output capacitance 126. As the energy is discharged from the output capacitance 126 of the secondary switch 108 by the current 302, a voltage at the secondary switch ($V_{108}$ in FIG. 2) decreases sinusoidally to zero. An amount of time (time period A) between times 206 and 208 remains constant independent of the amount of on-time of the primary switch 106 during a duty cycle of the primary switch 106.

Figure 3B:
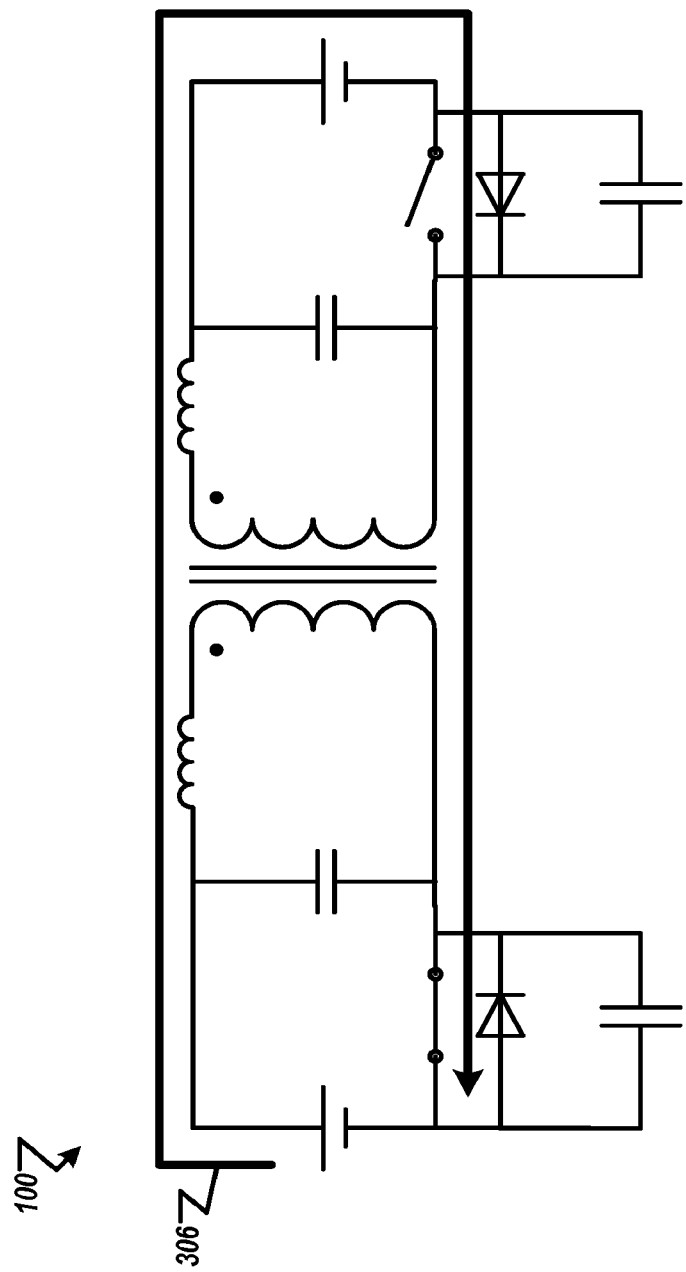

FIG. 3B illustrates current flow paths in isolated DC-DC power conversion circuit 100 between times 208 and 210 (time period B shown in FIG. 2). Between times 208 and 210, the primary switch 106 remains closed (turned on) and then is turned off at time 210. At time 208, body diode 122 of the secondary switch 108 turns on in response to the voltage at the secondary switch $V_{108}$ reaching zero due to the currents 302 and 304, which produces resonance current 306 through the leakage inductors 110 and 112 and the body diode 122 of the secondary switch 108. As the current 306 flows, the leakage inductors 110 and 112 continuously draw power from the primary power supply 102 and transfer energy to the secondary power supply 104. The amount of time between times 208 and 210 (time period B) is directly proportional to the on-time of the primary switch 106. For example, as the amount of on-time of the primary switch 106 is increased to increase the amount of energy (power) transferred from the primary side to the secondary side of the isolated DC-DC power conversion circuit 100, the amount of time between times 206 and 208 (time period A) remains constant, and the amount of time between times 208 and 210 (time period B) increases. In addition, as energy is transferred from the primary side to the secondary side of the isolated DC-DC power conversion circuit 100, the primary switch current $I_{106}$, capacitor current $I_{116}$, and transformer current $I_{TR}$ remain approximately constant and positive between times 208 and 210, and the primary switch voltage $V_{106}$ and secondary switch voltage $V_{108}$ are approximately zero.

Figure 3C:
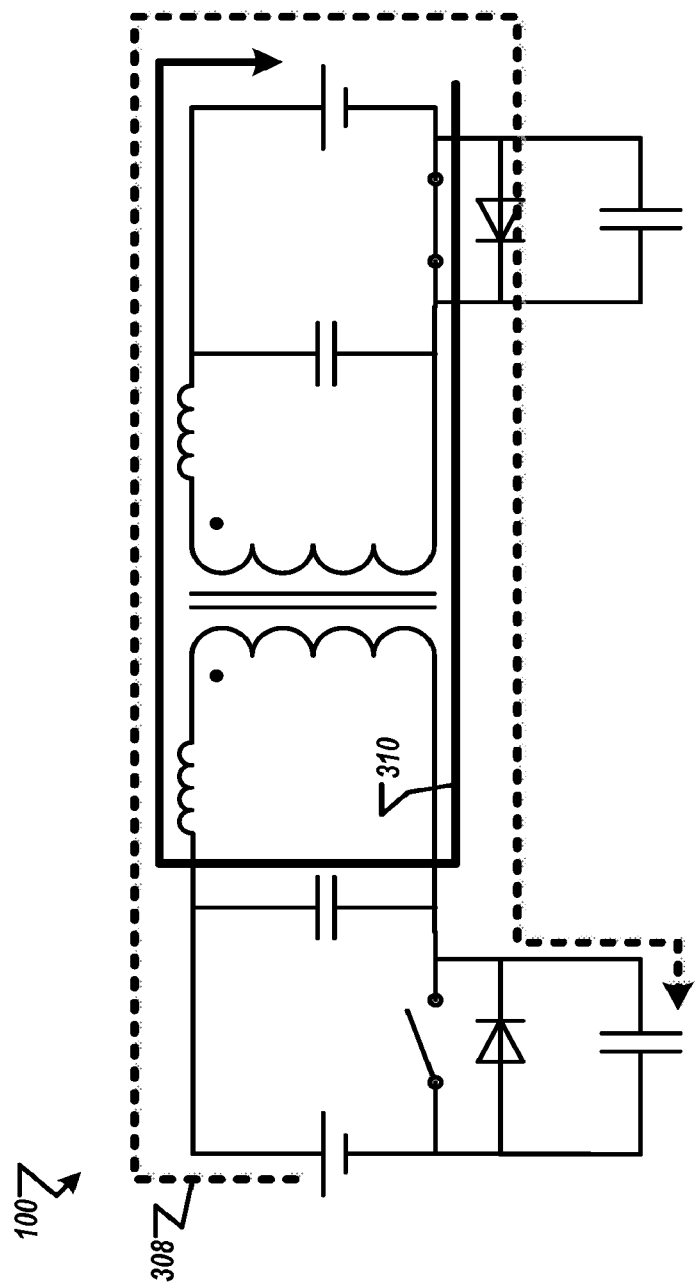

FIG. 3C illustrates current flow paths in isolated DC-DC power conversion circuit 100 between times 202 and 204 (time period C shown in FIG. 2). At time 202, the primary switch 106 is opened (turned off) by the control circuitry of the ECU after a period of on-time (time periods A and B). The primary switch 106 is turned off when the primary switch voltage $V_{106}$ is zero in order to maintain ZVS. In addition, the secondary switch 108 can be closed (turned on) between times 202 and 204 to operate as a synchronous rectifier in order to reduce losses through the isolated DC-DC power conversion circuit 100. In response to the primary switch 106 being turned off, resonance currents 308 and 310 flow through leakage inductors 110 and 112. For example, the current 310 discharges energy from the capacitor 116 through the leakage inductors 110 and 112, and the current 312 charges the output capacitance 124 of the primary switch 106 from the secondary power supply 104. In other words, stored energy from the capacitors 116 and 118 is discharged toward the secondary power supply 104. In addition, between times 202 and 204, the primary switch current $I_{106}$ and the transformer current $I_{TR}$ decrease sinusoidally to zero, and the voltage at the secondary switch $V_{108}$ remains at zero. The voltage at the primary switch 106 increases sinusoidally to a peak voltage 214 during time period C due to the currents 308 and 310. In some implementations, a voltage rating of the primary switch 106 is based on a magnitude of the peak voltage 214. As the voltage rating of the primary switch 106 is increased to accommodate the peak voltage 214 of the primary switch 106, resistance of the primary switch 106 also increases, which can cause a reduction in efficiency of the isolated DC-DC power conversion circuit 100.

Figure 3D:
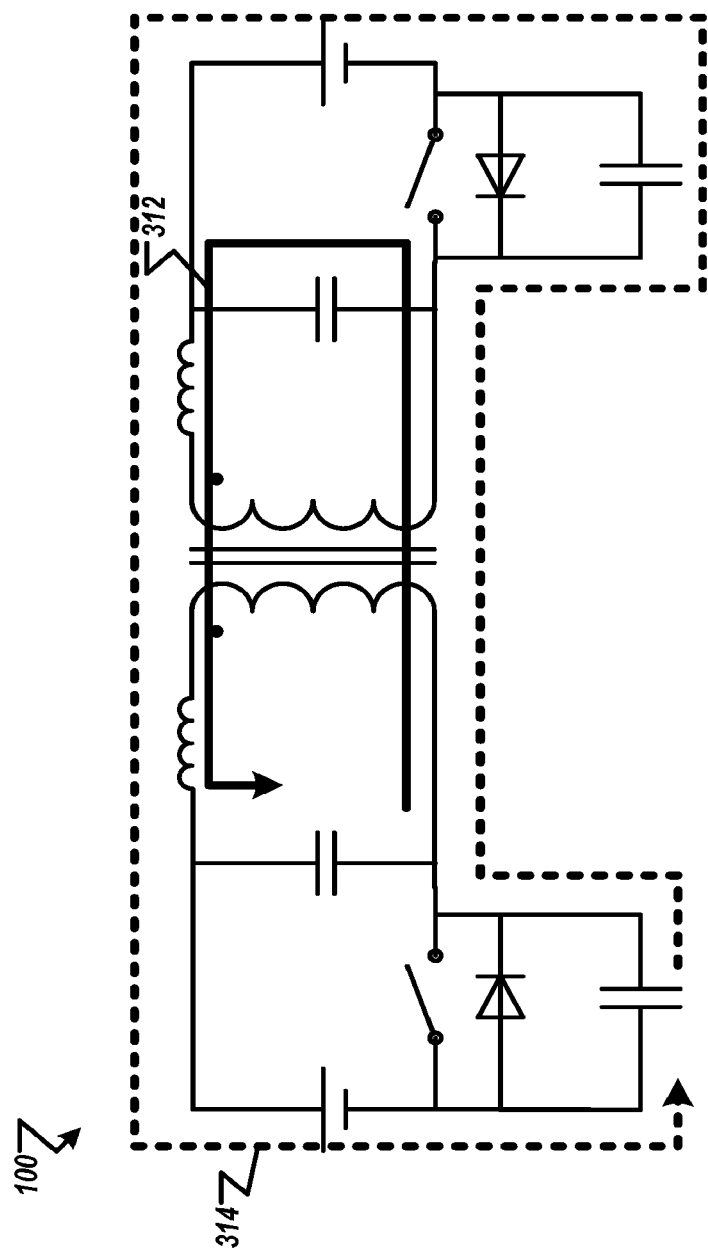

FIG. 3D illustrates current flow paths in isolated DC-DC power conversion circuit 100 between times 204 and 206 (time period D shown in FIG. 2). Between times 204 and 206, both the primary switch 106 and the secondary switch 108 are open (turned off). At time 204, the transformer current $I_{TR}$ is zero as the transformer current $I_{TR}$ goes from having a positive value to having a negative value. In response to the transformer current $I_{TR}$ becoming negative, the DC-DC power conversion circuit 100 produces resonance currents 312 and 314 that flow through the leakage inductors 110 and 112. For example, current 312 discharges energy from the capacitor 118 through the leakage inductors 110 and 112 and charges the capacitor 116 as is shown by the capacitor current $I_{116}$ during the time period D in FIG. 2, and the current 312 continues to charge and discharge the capacitors 116 and 118 due to the resonance. In addition, current 314 discharges the output capacitance 124 of the primary switch 106, and the primary switch voltage $V_{106}$ decreases sinusoidally to zero for ZVS turn-on at time 206, and the secondary switch voltage $V_{108}$ increases to a peak voltage for the secondary switch 108.

Figure 4:
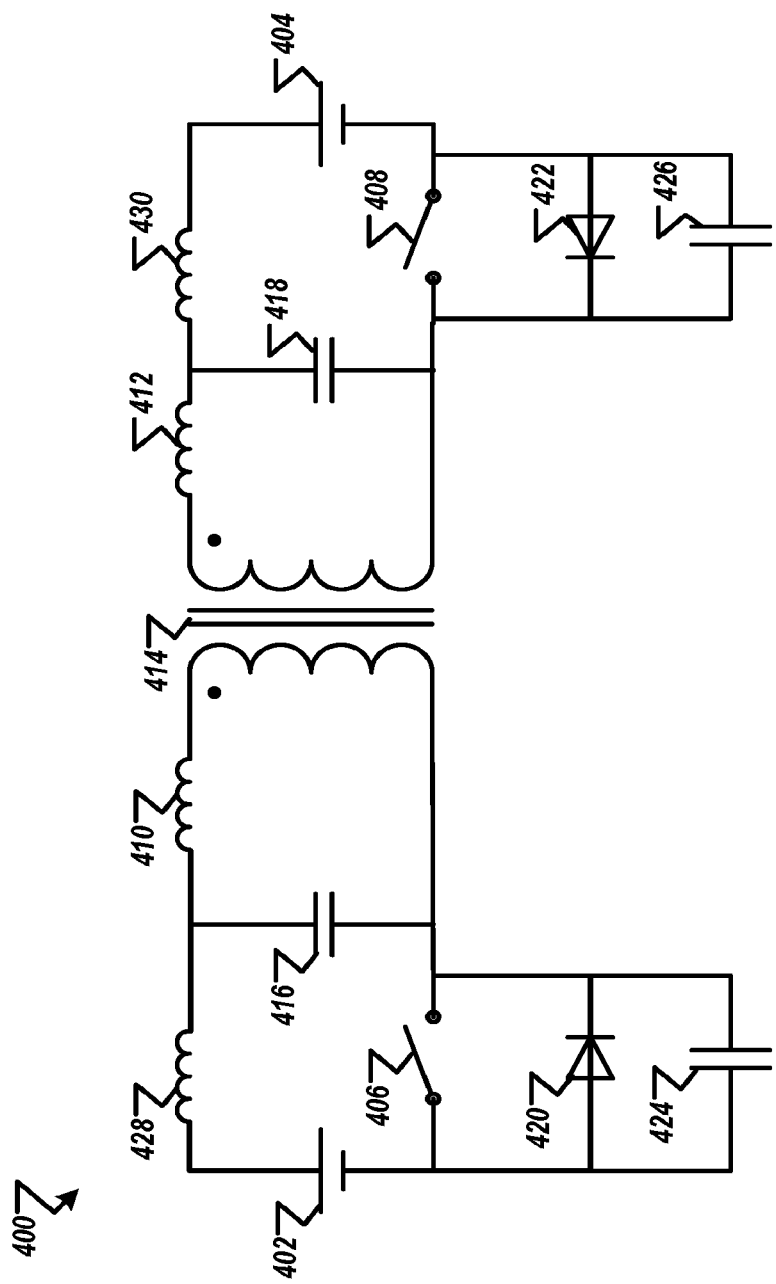
FIG. 4 is an exemplary schematic diagram of an isolated DC-DC power conversion circuit.

FIG. 4 is an exemplary illustration of an isolated DC-DC power conversion circuit 400. The isolated DC-DC power conversion circuit 400 has a similar structure to the isolated DC-DC power conversion circuit described previously (FIG. 1). For example, the isolated DC-DC power conversion circuit 400 is symmetric on either side of magnetic core transformer 414 and includes a primary power supply 402, secondary power supply 404, magnetic core transformer 414 (including leakage inductors 410 and 412), capacitors 416 and 418, primary switch 106 (including body diode 420 and output capacitance 424), and secondary switch 108 (including body diode 422 and output capacitance 426). On the primary side, the isolated DC-DC power conversion circuit 100 also includes inductor 428 connected in series with the primary power supply 402 between the primary power supply 402 and the capacitor 416. Likewise, on the secondary side, the isolated DC-DC power conversion circuit 400 includes inductor 430 connected in series with the secondary power supply 404 between the secondary power supply 404 and the capacitor 418. As will be discussed further herein, the inductor 428 provides an additional resonance current path on the primary side that reduces a peak voltage of the primary switch 406 that occurs during the off-time of the primary switch 406 when power is transferred from the primary side to the secondary side of the isolated DC-DC power conversion circuit 400 while maintaining circuit operational characteristics that resemble those described previously with respect to FIGS. 2 and 3A-3D. In addition, the inductor 430 provides an additional resonance current path on the secondary side that reduces a peak voltage of the secondary switch 408 that occurs during the off-time of the secondary switch 408 when power is transferred from the secondary side to the primary side of the isolated DC-DC power conversion circuit 400.

Figure 5:
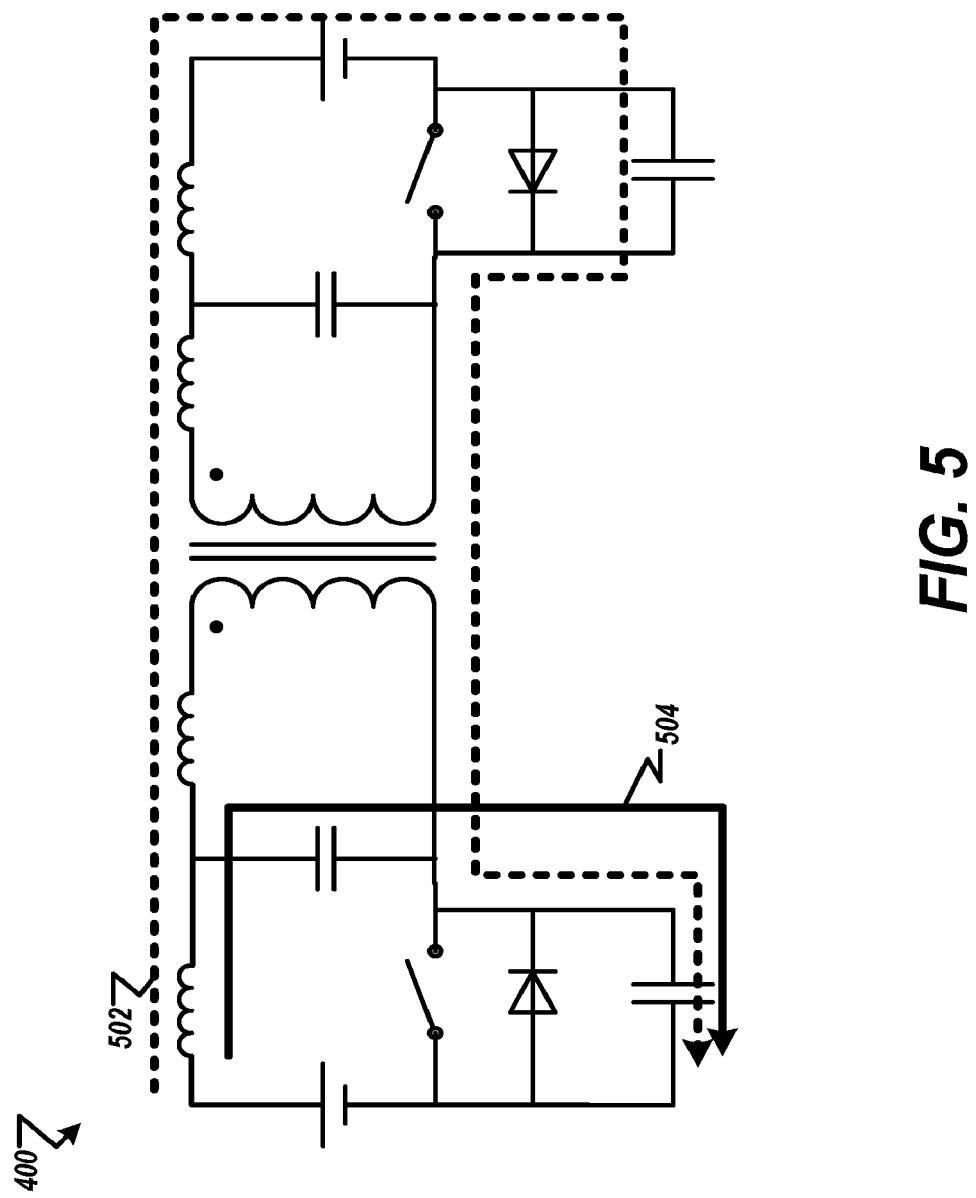
FIG. 5 illustrates exemplary current flow paths through an isolated DC-DC power conversion circuit.

FIG. 5 illustrates exemplary current flow paths through the isolated DC-DC power conversion circuit 400 during time period C shown in FIG. 2 (between times 202 and 204). Reference numerals for the components of the isolated DC-DC power conversion circuit 400 are not shown in FIG. 5 for clarity of the figure but can be assumed to correspond to the reference numerals shown in FIG. 4. For example, current 502 corresponds to the current 308 in FIG. 3C. In response to the primary switch 406 being turned off, the DC-DC power conversion circuit 400 produces additional resonance current 504 that flows through the inductor 428, the capacitor 416, and the output capacitance 424 of the primary switch 406. The additional resonance current 502 is generated by the isolated DC-DC power conversion circuit 400 when the primary switch 408 is turned off (e.g., time periods C and D in FIG. 2). Similarly, when the secondary switch 408 is turned off when power is transferred from the secondary side to the primary side of the isolated DC-DC power conversion circuit 400, an additional resonance current flows through the inductor 430, capacitor 418, and output capacitance 426 of the secondary switch 408. The isolated DC-DC power conversion circuit 400 is designed so that the additional resonance current 504 has a predetermined frequency based on a capacitance of the capacitor 416, output capacitance 426 of the primary switch 406, and inductance of the inductor 428 that causes a reduction in the primary switch voltage $V_{406}$ when the primary switch 406 is turned off (open).

Figure 6B:
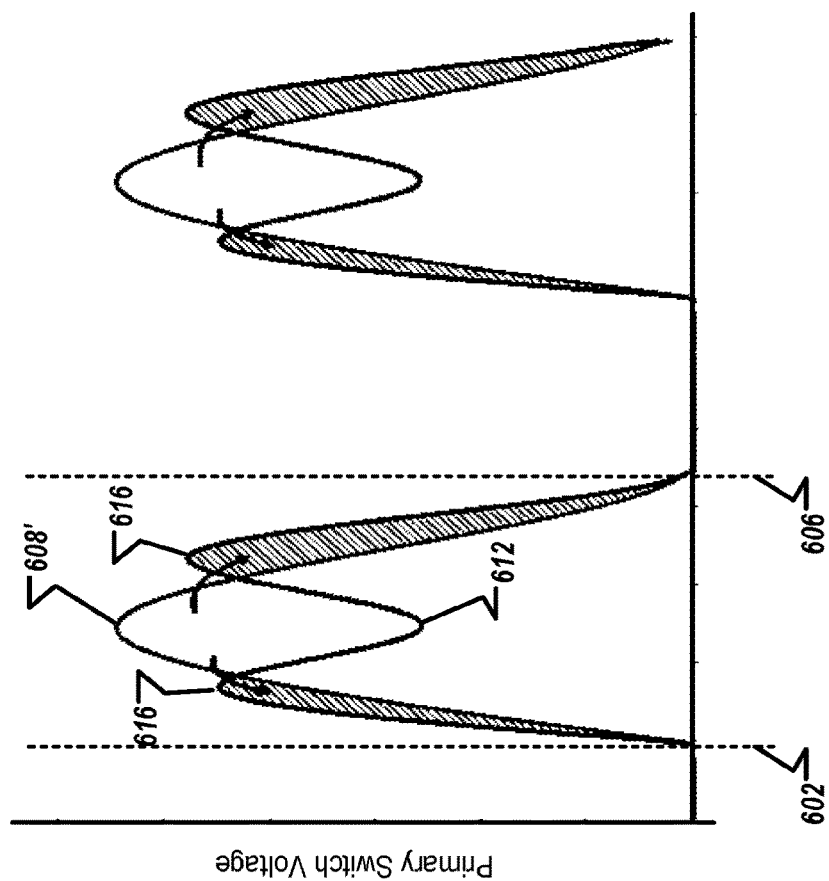
FIGS. 6A-6B illustrate exemplary voltage and waveforms for an isolated DC-DC power conversion circuit.
Figure 6A:
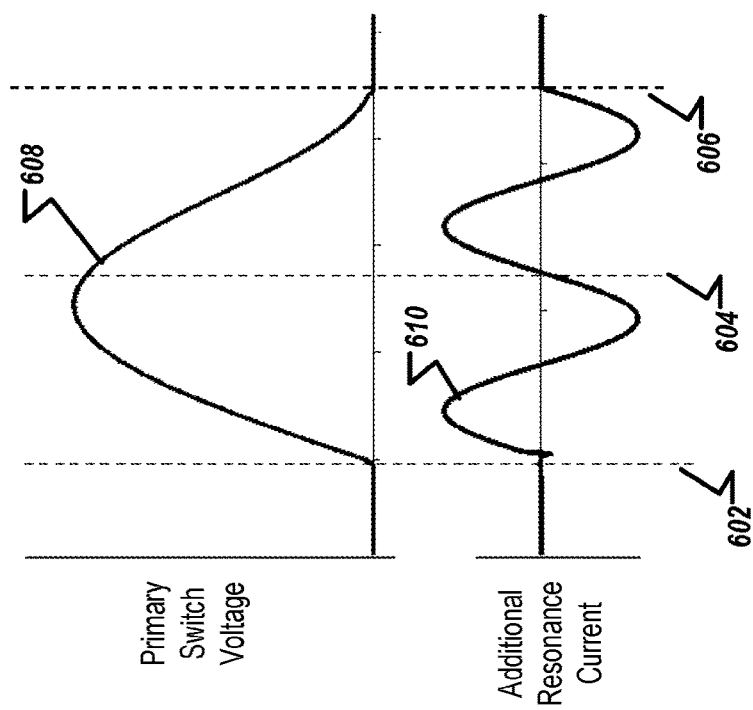

FIGS. 6A-6B illustrate exemplary voltage and current waveforms for the isolated DC-DC power conversion circuit 400. FIG. 6A includes a primary switch voltage waveform 608 that represents the off-time primary switch voltage $V_{106}$ for the isolated DC-DC power conversion circuit 100 that does not include the inductors 428 and 430 that are associated with the additional resonance current. For example, time 602 to time 604 represents time period C as shown in FIG. 2, and time 604 to 606 represents time period D as shown in FIG. 2. FIG. 6A also includes waveform 610 that shows the additional resonance current 504 on the primary side of the isolated DC-DC power conversion circuit 400 that results in a reduction in the peak voltage of the primary switch voltage waveform 608. FIG. 6B includes exemplary voltage waveforms that illustrate an effect of the additional resonance current 504 on the peak voltage of the primary switch 406. For example, waveform 608' corresponds to the waveform 608 in FIG. 6A, and waveform 612 represents the voltage at the primary switch 406 of the isolated DC-DC power conversion circuit 400 that has a reduced peak voltage due to the additional resonance current 504 through the inductor 428, capacitor 416, and output capacitance 424 of the primary switch 406. The additional resonance current 504 splits the voltage waveform 612 into two voltage peaks 616 and 618 that have a smaller magnitude than a magnitude of the peak voltage of the waveform 608' without changing overall operating characteristics of the isolated DC-DC power conversion circuit 400.

Figure 7:
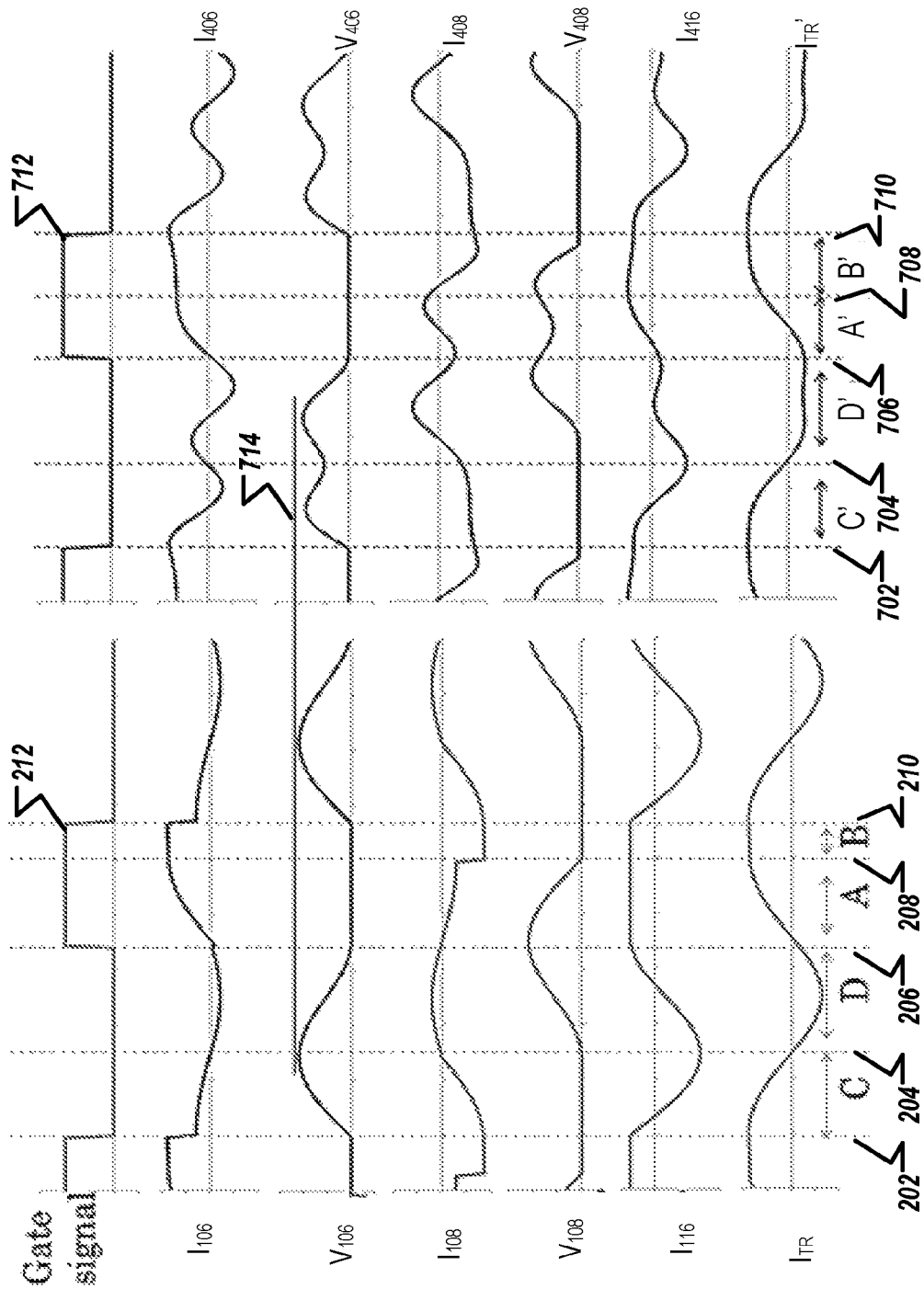
FIG. 7 illustrates exemplary voltage and current waveforms for an isolated DC-DC power conversion circuit.

FIG. 7 illustrates exemplary voltage and current waveforms for isolated DC-DC power conversion circuits 100 and 400. Waveforms 212, $I_{106}$, $V_{106}$, $I_{108}$, $V_{108}$, $I_{116}$ and $I_{TR}$ are the waveforms from FIG. 2 that are associated with a duty cycle of the primary switch 106 of the isolated DC-DC power conversion circuit 100 that is split into time periods A, B, C, and D by times 202, 204, 206, 208, and 210 and provide a comparison between operation of the isolated DC-DC power conversion circuit 100 and the isolated DC-DC power conversion circuit 400 that includes inductors 428 and 430 that provide the additional resonance current path. FIG. 7 also includes waveform 712 that illustrates a duty cycle for the primary switch 406 that can be turned on at time 706 and subsequently turned off at time 710, according to some implementations. FIG. 7 also includes waveforms for primary switch current $I_{406}$, primary switch voltage $V_{406}$, secondary switch current $I_{408}$, secondary switch voltage $V_{408}$, primary capacitor current $I_{416}$, and transformer current $I_{TR'}$. In addition, the waveforms are also divided into four time periods (A', B', C', and D') that are divided by times 702, 704, 706, 708, and 710. The amount of power transferred from the primary side to the secondary side of the isolated DC-DC power conversion circuit 400 can be modified by increasing or decreasing an on-time of the primary switch 406. The time periods A', B', C', and D' associated with the isolated DC-DC power conversion circuit 400 correspond to the time periods A, B, C, and D for the isolated DC-DC power conversion circuit 100.

In addition, reference line 714 corresponds to the peak voltage at the primary switch 106 of the isolated DC-DC power conversion circuit 100 that does not include the additional resonance current associated with the inductors 428 and 430. The reference line 714 shows that the peak voltage at the primary switch 106 is greater than the peak voltage of the primary switch 406 of the isolated DC-DC power conversion circuit 400. The isolated DC-DC power conversion circuit 400 includes the additional resonance current 504 through the inductor 428 that splits the peak voltage into two voltage peaks during time periods C' and D' that have a magnitude that is less than the peak voltage of the primary switch 106, which reduces voltage stresses on the primary switch 406 and improves overall circuit efficiency. Effects of the additional resonance current 504 may be present in one or more of the other waveforms associated with the isolated DC-DC power conversion circuit 400, but the overall operation of the isolated DC-DC power conversion circuit 400 is not significantly affected. For example, the transformer current $I_{TR'}$ represents an amount of power transferred between the primary and secondary sides of the DC-DC power conversion circuit 400, and the transformer current $I_{TR'}$ is similar to the transformer current $I_{TR}$ for the isolated DC-DC power conversion circuit 100. In addition, the voltage of the capacitor $V_{416}$ also exhibits effects from the presence of the additional resonance current 504, but an integral of the capacitor voltage $V_{416}$ is the same as an integral of the capacitor voltage $V_{116}$, which is designed to be zero for transformer excitation.

Figure 8:
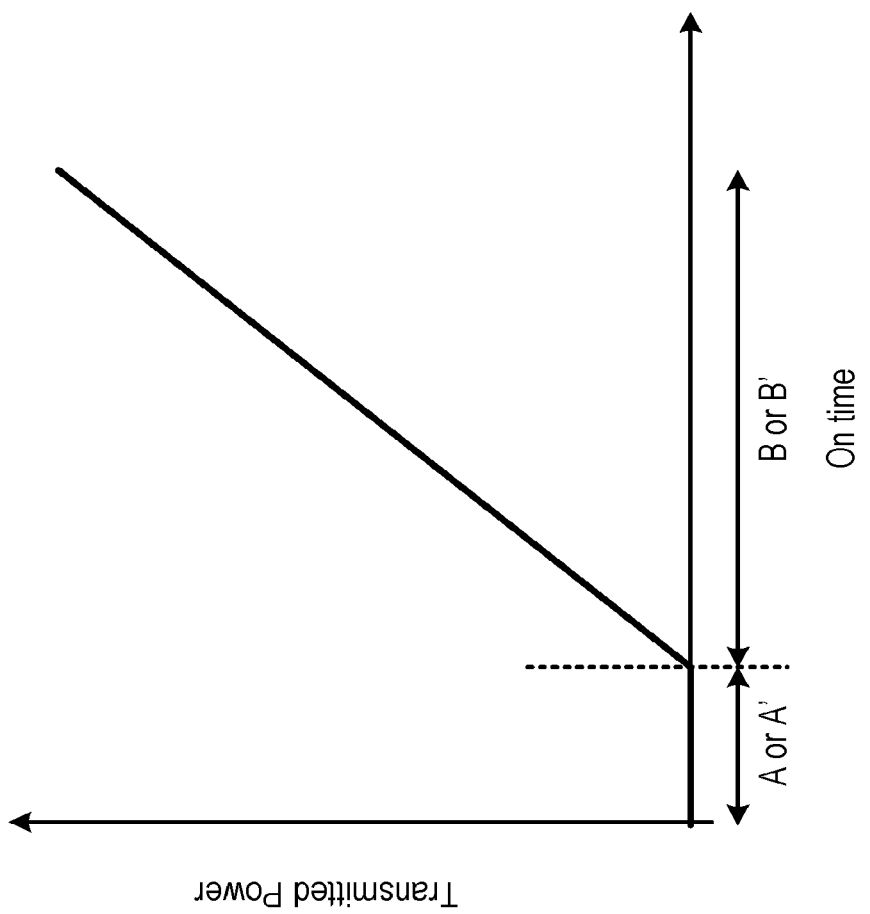
FIG. 8 is an exemplary graph of switch on-time for an isolated DC-DC power conversion circuit.

FIG. 8 is an exemplary graph of switch on-time for the isolated DC-DC power conversion circuits 100 and 400. In some implementations, the amount of power transferred from the primary side to the secondary side of the isolated DC-DC power conversion circuit 100 or can be modified by increasing or decreasing an on-time of the primary switch 106, 406. The graph of FIG. 8 illustrates primary switch on-time vs. amount of transmitted power. For example, to increase the amount of power transferred from the primary side to the secondary side of the isolated DC-DC power conversion circuit 100, 400, the on-time of the primary switch 106, 406 is increased. Likewise, to decrease the amount of power transferred from the primary side to the secondary side of the isolated DC-DC power conversion circuit 100, 400, the on-time of the primary switch 106, 406 is decreased. In addition, power transfer occurs between the primary side to the secondary side of the isolated DC-DC power conversion circuit 100 or 400 when an amount of on-time of the primary switch 106, 406 or secondary switch 108, 408 is greater than the amount of time associated with time periods A or A'. When the amount of on-time of the primary switch 106, 406 or secondary switch 108, 408 exceeds the time period A or A', the amount of power transferred between the primary and secondary sides of the isolated DC-DC power conversion circuit 100 or 400 is proportional to the length of the time period B or B'.

While the on-time of the primary switch 106, 406 or secondary switch 108, 408 is can be increased or decreased in order to increase or decrease the amount of power transferred between the primary and secondary sides of the isolated DC-DC power conversion circuit 100, 400, the off-time of the primary switch 106, 406 or secondary switch 108, 408 can be held constant. In some implementations, the off-time of the primary switch 106, 406 or secondary switch 108, 408 can be a sum the amounts of time associated with time periods C or C' and D or D' (shown in FIGS. 2 and 7). The amounts of time associated with time periods C or C' and D or D' are based on a resonant frequency of the isolated DC-DC power conversion circuit 100, 400 that are based on various inductance and capacitance parameters. For example, the amount of time associated with time period C or C' can be described by:

$$T(C \text{ or } C') = \frac{1}{4} \frac{1}{2\pi \sqrt{(L_{110/410} + L_{110/410} L_{112/412})(C_{116/416} + C_{124/424})}},$$

where $L_{110/410}$ corresponds to an inductance of leakage inductor 110/410, $L_{112/412}$ corresponds to an inductance of leakage inductor 112/412, $C_{116/416}$ corresponds to a capacitance of capacitor 116/416, and $C_{124/424}$ corresponds to a capacitance of output capacitance 124/424. In addition, the amount of time associated with time period D or D' can be described by:

$$T(D \text{ or } D') = \frac{1}{2} \frac{1}{2\pi \sqrt{\frac{(L_{110/410} + L_{110/410} L_{112/412})}{(C_{116/416} + C_{124/424})(C_{118/418} + C_{126/426})}{(C_{116/416} + C_{124/424} + C_{118/418} + C_{126/426})}}},$$

where $C_{118/418}$ corresponds to a capacitance of capacitor 118/418, and $C_{126/426}$ corresponds to a capacitance of output capacitance 126/426.

Figure 9:
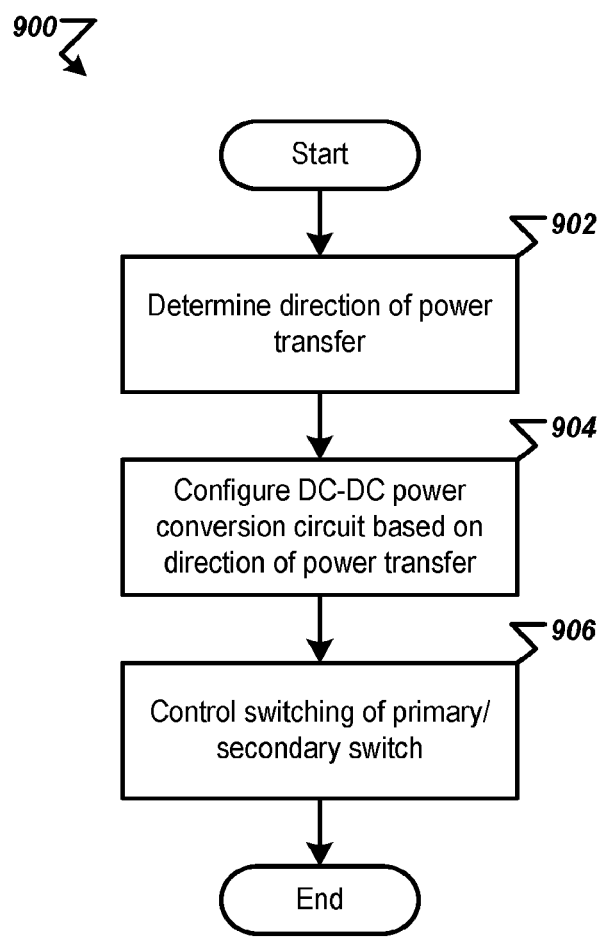
FIG. 9 is an exemplary flowchart of an isolated DC-DC power conversion process.

FIG. 9 is an exemplary flowchart of an isolated DC-DC power conversion process 900. The isolated DC-DC power conversion process 900 can be controlled by one or more ECUs or similar circuitry. Sensors installed within one or more battery cells and other electrical components of an EV power transfer system can sense battery SOC, voltage, current, and the like. The ECUs can process sensor data, display electric power module information to a user, and send control signals to actuators that align the EV power transfer system to maintain continuous power to the electrical components. In some implementations, the actuators send control signals to control the duty cycle and switching frequency of the primary switch 106, 406 and secondary switch 108, 408, operating frequency, and direction of power transfer of the isolated DC-DC power conversion circuit 120. The ECUs can also align a plurality of isolated DC-DC power conversion circuits to perform power transfer among a one or more sources and/or loads within an EV power transfer system. The process 900 is described with respect to the isolated DC-DC power conversion circuit 400 but can also be applied to the isolated DC-DC power conversion circuit 100.

At step 902, the control circuitry determines a direction of power transfer through the isolated DC-DC power conversion circuit 400. In some implementations, the electrical components are connected at the primary DC power supply 402 and secondary DC power supply 404 and can function as either power sources or electrical loads. For example, a battery cell in an electrical system of an EV can function as a power source to power electrical components of a vehicle, such as brakes, audio systems, and the like. The battery cell can also function as an electrical load during battery cell balancing among a plurality of battery cells. In some implementations, the direction of power transfer can be based on a difference in voltage between the primary DC power supply 402 and the secondary DC power supply 404 or other power/load demands within an electric power system. For example, if the voltage of the primary DC power supply 402 is greater than the voltage of the secondary DC power supply 404, then the control circuitry may determine that power is transferred from the primary side to the secondary side of the isolated DC-DC power conversion circuit 400.

At step 904, the control circuitry configures the isolated DC-DC power conversion circuit 400 based on the desired direction of power transfer. In some implementations, control signals are sent to align at least one isolated DC-DC power conversion circuit 400 based on a desired direction of power transfer. The control circuitry can send control signals to voltage sensors, current sensors, and timers as well as to the primary switch 406 and the secondary switch 408 to align the isolated DC-DC power conversion circuit 400 for the desired direction of power transfer.

At step 906, the control circuitry controls switching the primary switch 406 and/or secondary switch 408 based on the desired direction of power transfer. If power is being transferred from the primary side to the secondary side of the isolated DC-DC power conversion circuit 400, a control signal is sent to turn on the primary switch 406 at time 706 (FIG. 7) when the voltage at the primary switch $V_{406}$ is zero to implement ZVS. In implementations where power is transferred from the secondary side to the primary side of the isolated DC-DC power conversion circuit 400, a control signal is sent to turn on the secondary switch 408 when the voltage though the secondary switch $V_{408}$ is zero to implement ZVS. The control circuitry can receive sensor data relating to current at the primary switch 406 to determine when to send the control signal to turn on the primary switch 406. In some implementations, the control circuitry determines when to turn on the primary switch 406 based on an amount of time that has passed since the primary switch 406 was turned off, such as in a constant off-time implementation. In an example, the control signal is sent to a gate driver circuit that turns on the primary switch 406. In some aspects, the gate driver circuits can be integrated into the primary switch 406 and the secondary switch 408.

The amount of power transferred from the primary side to the secondary side of the isolated DC-DC power conversion circuit 400 can be modified by changing the amount of on-time of the primary switch 406. To increase the amount of power transferred from the primary side to the secondary side of the isolated DC-DC power conversion circuit 400, the on-time of the primary switch 406 is increased. To decrease the amount of power transferred from the primary side to the secondary side of the isolated DC-DC power conversion circuit 400, the on-time of the primary switch 406 is decreased. The quantity of power that is transferred from the primary side to the secondary side of the isolated DC-DC power conversion circuit can be determined based on the power and voltage characteristics of the electrical components in the electrical system.

In addition, a control signal is sent to turn off the primary switch 406 to implement ZVS (time 710 or 702 in FIG. 7) when the voltage at the primary switch 406 is zero, which can end the active signal time for the duty cycle of the primary switch 406. The control circuitry can receive sensor data relating to voltage at the primary switch 106 to determine when to send the control signal to turn off the primary switch 406. In some implementations, the control circuitry determines when to turn off the primary switch 406 when an amount of time that has passed since the primary switch 406 was turned on corresponds to a predetermined amount of power transfer.

Figure 10:
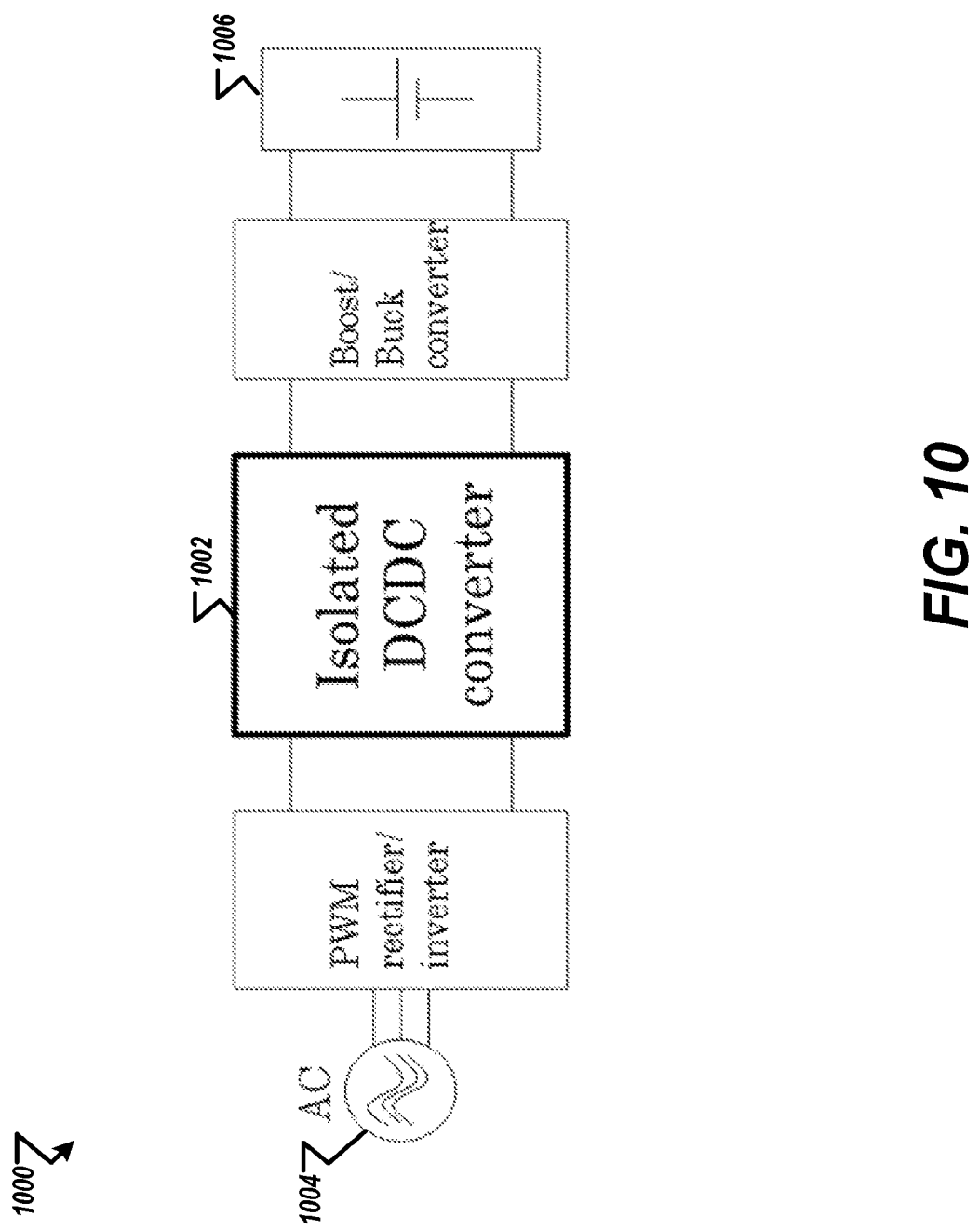
FIG. 10 is an exemplary illustration of an application of an isolated DC-DC power conversion circuit.

FIG. 10 is an exemplary illustration of an application 1000 of the isolated DC-DC power conversion circuit 100, 400. For example, isolated DC-DC power conversion circuit 1002 is an implementation of the isolated DC-DC power conversion circuit 100, 400 and can connect an AC power source 1004, such as a vehicle charging station to at least one battery cell 1006 of a vehicle. The isolated DC-DC power conversion circuit 1002 provides isolation between the AC power source 1004 and the at least one battery cell 1006 and provides for bi-directional power transfer.

Figure 11:
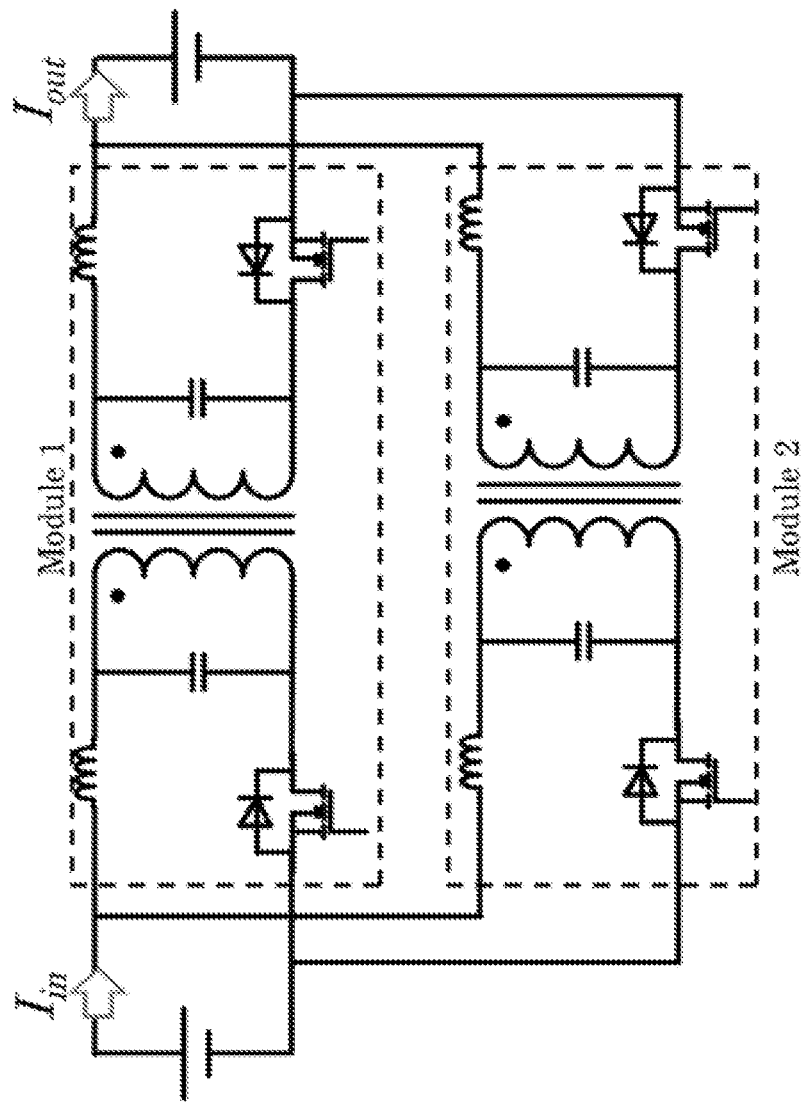
FIG. 11 is an exemplary schematic diagram of modularly connected isolated DC-DC power conversion circuits.
Figure 12:
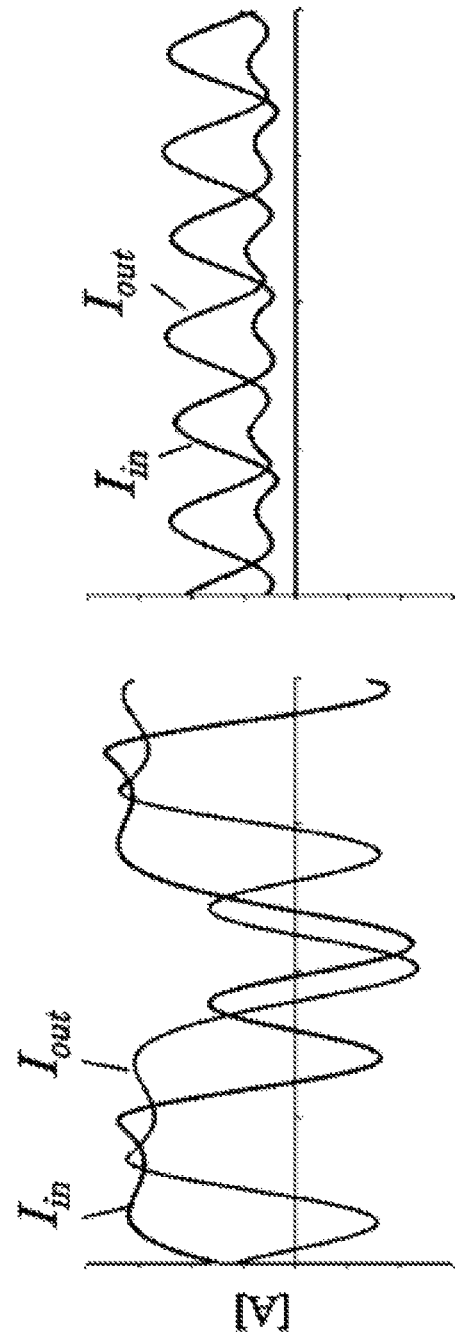
FIG. 12 illustrates current waveforms for modularly connected isolated DC-DC power conversion circuits.

FIG. 11 is an exemplary schematic diagram of modularly connected isolated DC-DC power conversion circuits. FIG. 11 illustrates two parallel-connected isolated DC-DC power conversion circuits 100 (Module 1 and Module 2), but multiple isolated DC-DC power conversion circuits can be similarly connected in parallel. Connecting multiple modular isolated DC-DC power conversion circuits in parallel allows the power transfer range of the isolated DC-DC power conversion circuits to be increased. FIG. 11 also illustrates input current $I_{in}$ and output current $I_{out}$ that are shown as current waveforms in FIGS. 12A-12B. As shown in FIGS. 12A and 12B, the control circuitry implements phase shift control for parallel-connected isolated DC-DC power conversion circuits to reduce circulated power, reduce current and voltage peaks, and allow a switching frequency to be increased, which provides for a reduced filter size. For example, FIG. 12A illustrates the input current $I_{in}$ and output current $I_{out}$ for a zero degree phase shift, and FIG. 12B illustrates the input current $I_{in}$ and output current $I_{out}$ for a 108-degree degree phase shift. In addition, the control circuitry is can determine an amount of phase shift between switches of the parallel-connected isolated DC-DC power conversion circuits based on a number of the power conversion circuitry connected in parallel, where the amount of phase shift between switches of the isolated DC-DC power conversion circuits corresponds to 360/N, where N is a number of parallel-connected isolated DC-DC power conversion circuits. For example, if two isolated DC-DC power conversion circuits are connected in parallel, then the amount of phase shift between the operation of the switches controlling the power transfer is 180 degrees.

Aspects of the present disclosure are directed to performing bi-directional power transfer through an isolated DC-DC power conversion circuit that is symmetric on either side of a magnetic core transformer. In order to reduce circuit losses and improve efficiency, soft-switching can be implemented. In addition, the isolated DC-D power conversion circuit includes an inductor on either side of the magnetic core transformer that provides additional resonance current paths that cause voltage peaks that can occur at the primary switch and the secondary switch to be reduced. When the voltage peaks at the switches are reduced the switches with reduced voltage ratings can be implemented in the isolated DC-DC power conversion circuit, which decreases resistance and reduces losses.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 13:
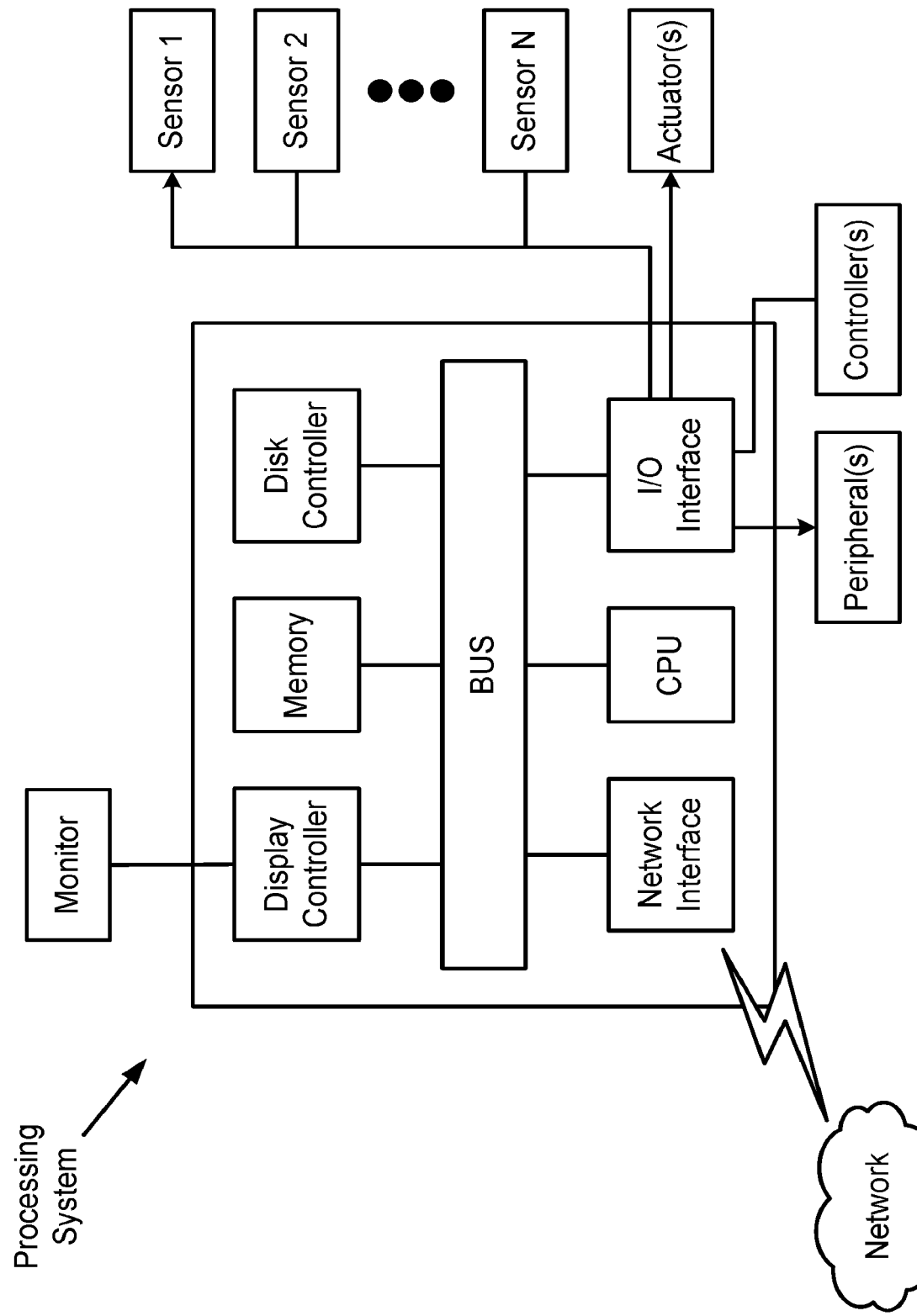
FIG. 13 schematically illustrates a processing system.

FIG. 13 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle. The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the isolated DC-DC power conversion circuit 120 or distributed power system. For example, the user can use the controller to set up default periods and duty cycles for the primary switch 106 and the secondary switch 108 of the isolated DC-DC power conversion circuit 120. The I/O interface can also provide an interface for outputting control signals to one or more actuators to control various actuated components, including gate driver circuits and other circuitry in the isolated DC-DC power conversion circuit 120. In some implementations, the actuators send control signals to control the duty cycle or switching frequency of the primary switch 106 and secondary switch 108, operating frequency, and direction of power transfer of the isolated DC-DC power conversion circuit 120. The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices. Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
   power conversion circuitry including
      first circuitry on a first side of a transformer having a first power supply, a first switch, a first capacitor connected in parallel with a first winding of the transformer, and a first inductor connected between the first power supply and the first capacitor, the first inductor being directly connected to the first winding of the transformer and being directly connected to the first power supply, and
      second circuitry on a second side of the transformer having a second power supply, a second switch, a second capacitor connected in parallel with a second winding of the transformer, and a second inductor connected between the second power supply and the second capacitor, the second inductor being directly connected to the second winding of the transformer and being directly connected to the second power supply,
      wherein the first inductor or the second inductor provides an additional resonance current path through the power conversion circuitry that is configured to reduce a peak voltage at the first switch or the second switch; and
   control circuitry configured to
      determine a direction of power transfer through the power conversion circuitry,
         configure the first circuitry and the second circuitry based on the determined direction of power transfer, and
         control switching of the first switch and the second switch based on the determined direction of power transfer and a quantity of power transfer, the first switch being turned on when a voltage at the first switch is zero,
      wherein the on period lengths of the first switch and the second switch are controlled by the control circuitry independently of the off period lengths of the first switch and the second switch such that the on period lengths of the first switch and second switch are varied by the control circuitry based on an amount of power to be transferred while the off period lengths of the first switch and the second switch remain constant, and
      wherein the power conversion circuitry is configured to perform bi-directional power transfer, and
      the first switch and the second switch are operated out of phase with each other.

2. The system of claim 1, wherein the first circuitry and the second circuitry are symmetric on either side of the transformer.

3. The system of claim 1, wherein the control circuitry is further configured to control the switching of the first switch and the second switch by implementing soft switching.

4. The system of claim 1, wherein the power conversion circuitry, in response to the control circuitry turning on the first switch, generates at least one first resonance current through a first leakage inductor of the first circuitry and a second leakage inductor of the second circuitry for a first period of time, wherein the second capacitor is charged by the at least one first resonance current.

5. The system of claim 4, wherein the first period of time that the at least one first resonance current flows through the first leakage inductor and the second leakage inductor remains constant independent of an on-time of the first switch.

6. The system of claim 4, wherein the power conversion circuitry, in response to the second voltage of the second switch reaching zero due to the at least one first resonance current, generates at least one second resonance current through the first leakage inductor, the second leakage inductor, and a body diode of the second switch for a second period of time, wherein
   energy is transferred from the first power supply to the second power supply through the at least one second resonance current path.

7. The system of claim 6, wherein an increase in an on-time of the first switch corresponds to an increase in the second period of time associated with the at least one second resonance current.

8. The system of claim 1, wherein the power conversion circuitry, in response to the control circuitry turning off the first switch, generates at least one third resonance current through a first leakage inductor of the first circuitry and a second leakage inductor of the second circuitry for a third period of time, wherein energy is discharged from the first capacitor through the first leakage inductor and the second leakage inductor, and the second power supply charges an output capacitance of the first switch via the at least one third resonance current.

9. The system of claim 8, wherein a first voltage at the first switch increases sinusoidally to a first peak voltage during the third period of time based on the at least one third resonance current.

10. The system of claim 9, wherein the power conversion circuitry, in response to a transformer current becoming negative, generates at least one fourth resonance current through the first leakage inductor of the first circuitry and the second leakage inductor of the second circuitry for a fourth period of time, wherein:

the energy is discharged from the second capacitor through the first leakage inductor and the second leakage inductor.

11. The system of claim 10, wherein the first voltage at the first switch decreases sinusoidally to zero and a second voltage at the second switch increases to a second peak voltage during the fourth period of time.

12. The system of claim 10, wherein the first inductor provides the additional resonance current path through the first inductor, the first capacitor, and the first switch.

13. The system of claim 12, wherein the power conversion circuitry is configured to generate an additional resonance current through the additional resonance current path during the third period of time and the fourth period of time when the first switch is turned off.

14. The system of claim 13, wherein a frequency of the additional resonance current is based on a capacitance of the first capacitor, an output capacitance of the first switch, and an inductance of the first inductor.

15. The system of claim 1, further comprising a plurality of the power conversion circuitry connected in parallel.

16. The system of claim 15, wherein the control circuitry is further configured to control the switching of the first switch or the second switch of the plurality of the power conversion circuitry using phase shift control of the first switch or the second switch.

17. The system of claim 16, wherein the control circuitry is further configured to determine an amount of phase shift between a plurality of switches associated with the plurality of the power conversion circuitry based on a number of the power conversion circuitry connected in parallel.

18. A method comprising:

determining a direction of power transfer through power conversion circuitry including first circuitry on a first side of a transformer having a first power supply, a first switch, a first capacitor connected in parallel with a first winding of the transformer, and a first inductor connected between the first power supply and the first capacitor, and second circuitry on a second side of the transformer having a second power supply, a second switch, a second capacitor connected in parallel with a second winding of the transformer, and a second inductor connected between the second power supply and the second capacitor, the first inductor being directly connected to the first winding of the transformer and being directly connected to the first power supply, the second inductor being directly connected to the second winding of the transformer and being directly connected to the second power supply;

configuring the first circuitry and the second circuitry based on the determined direction of power transfer; and controlling switching of the first switch and the second switch based on the determined direction of power transfer and a quantity of power transfer, the first switch being turned on when a voltage at the first switch is zero, wherein on period lengths of the first switch and the second switch are controlled independently of off period lengths of the first switch and the second switch such that the on period lengths of the first switch and second switch are varied by the control circuitry based on an amount of power to be transferred while the off period lengths of the first switch and the second switch remain constant, and wherein the power conversion circuitry is configured to perform bi-directional power transfer, and the first switch and the second switch are operated out of phase with each other.

19. A system comprising:

control circuitry configured to determine a direction of power transfer through power conversion circuitry including first circuitry on a first side of a transformer having a first power supply, a first switch, a first capacitor connected in parallel with a first winding of the transformer, and a first inductor connected between the first power supply and the first capacitor, and second circuitry on a second side of the transformer having a second power supply, a second switch, a second capacitor connected in parallel with a second winding of the transformer, and a second inductor connected between the second power supply and the second capacitor, the first inductor being directly connected to the first winding of the transformer and being directly connected to the first power supply, the second inductor being directly connected to the second winding of the transformer and being directly connected to the second power supply, configure the first circuitry and the second circuitry based on the determined direction of power transfer, and control switching of the first switch and the second switch based on the determined direction of power transfer and a quantity of power transfer, the first switch being turned on when a voltage at the first switch is zero, wherein on period lengths of the first switch and the second switch are controlled independently of off period lengths of the first switch and the second switch such that the on period lengths of the first switch and second switch are varied by the control circuitry based on an amount of power to be transferred while the off period lengths of the first switch and the second switch remain constant, and wherein the power conversion circuitry is configured to perform bi-directional power transfer, and the first switch and the second switch are operated out of phase with each other.

* * * * *